United States Patent
Poorman et al.

[11] Patent Number: 5,600,125
[45] Date of Patent: Feb. 4, 1997

[54] COMPENSATION AND STATUS MONITORING DEVICES FOR FIBER OPTIC INTENSITY-MODULATED SENSORS

[76] Inventors: Thomas J. Poorman, 2705 Windwood Dr., Ann Arbor, Mich. 48105; Marek T. Wlodarczyk, 6865 Vachon Dr., Bloomfield Hills, Mich. 48301

[21] Appl. No.: 442,218

[22] Filed: May 16, 1995

[51] Int. Cl.⁶ .................................. G01J 1/20; H01J 5/16
[52] U.S. Cl. ................. 250/205; 250/214 B; 250/227.16
[58] Field of Search ......................... 250/227.14, 227.16, 250/205, 214 B, 214 C; 356/73.1; 327/514

[56] References Cited

U.S. PATENT DOCUMENTS

| | | | |
|---|---|---|---|
| 4,644,145 | 2/1987 | Gundner | 250/205 |
| 4,827,116 | 5/1989 | Takagi et al. | 250/205 |
| 5,390,546 | 2/1995 | Wlodarczyk | 73/715 |
| 5,421,195 | 6/1995 | Wlodarczyk | 250/227.16 |

Primary Examiner—Stephone Allen
Attorney, Agent, or Firm—James M. Deimen

[57] ABSTRACT

Compensation and health monitoring techniques and devices for fiber optic intensity modulated sensors provide automatic adjustment of light intensity in order to maintain continuous calibration of the fiber optic sensors in the presence of undesirable environmental or handling conditions. These undesirable conditions may arise from such factors as fiber bending, optical connector mechanical and thermal instabilities, extreme temperatures at sensors, and changes in optical coupling between optical sources (e.g., light emitting diodes) and detectors (e.g., PIN photodiodes) and the optical fibers. Through light intensity normalization, the new techniques enable a continuous calibrated sensor output and sensor health monitoring by continuous or intermittent observation of the light emitting diode current.

5 Claims, 2 Drawing Sheets

5,600,125

COMPENSATION AND STATUS MONITORING DEVICES FOR FIBER OPTIC INTENSITY-MODULATED SENSORS

BACKGROUND OF THE INVENTION

The field of the invention comprises fiber optic sensors and, in particular, intensity-modulated fiber optic sensors such as microbend and diaphragm type sensors. These devices operate on the principle of relating the changes in light intensity transmitted by an optical fiber to the changes in a measured parameter such as pressure.

In a microbend sensor, a measured parameter alters light intensity by exerting stress or microbend deformations on a section of optical fiber. Such a sensor is disclosed in U.S. Pat. No. 5,421,195 to one of the applicants. In a diaphragm sensor, the light reflected by a flexing diaphragm changes proportionally with the measured parameter. Such a sensor is disclosed in U.S. Pat. No. 5,390,546 also to one of the applicants.

While intensity modulated sensors can be robust and of low cost, they may be affected by environmental and handling factors which in turn will result in a sensor error. These undesirable factors may include fiber bending, optical connector thermal and mechanical instabilities, optical throughput changes due to exposure of optical fibers to high temperatures, changes in optical coupling efficiency between optical sources (e.g., light emitting diodes (LED)), detectors (e.g., PIN photodiodes) and an optical fiber, separate temperature effects on LEDs and photodiodes, or aging of these components.

Compensation techniques and devices have been reported in the past to reduce the susceptibility of intensity-modulated sensors to environmental and handling errors. Prior reports describe dual wavelength, multi-fiber, and time of flight compensation techniques for both microbend and diaphragm-type sensors.

The prior techniques and devices tend to be expensive and complex and therefore not well suited for low-cost sensors aimed at industrial control applications.

SUMMARY OF THE INVENTION

The invention comprises compensation and health monitoring techniques and devices for fiber optic intensity modulated sensors. Primarily the techniques and devices provide automatic adjustment of light intensity in order to maintain continuous calibration of the fiber optic sensors in the presence of undesirable environmental or handling conditions. These undesirable conditions may arise from such factors as fiber bending, optical connector thermal and mechanical instabilities, extreme temperatures at the sensor, and changes in optical coupling between optical sources (e.g., light emitting diodes (LEDs)) and detectors (e.g., PIN photodiodes) and an optical fiber.

Through light intensity normalization, the new techniques enable a continuous calibrated sensor output and sensor health monitoring by continuous or intermittent observation of the LED current. The new techniques and devices offer a low cost alternative to more expensive and complex techniques previously developed and are particularly well suited for industrial control applications.

DESCRIPTION OF THE PREFERRED EMBODIMENTS

A typical intensity modulated fiber optic sensor system comprises a sensor such as those noted above connected to an interface/monitoring unit via an optical connector. The sensor may be constructed with one or more optical fibers. The interface/monitoring unit may consist of one or more multiple optical sources and optical detectors and, optionally, include optical couplers. The following description pertains to a single fiber optic sensor which incorporates a fiber optic coupler in the sensor interface but the invention is not limited to this specific example.

In an uncompensated intensity-modulated fiber optic sensor, light throughput variations result in both offset and sensitivity errors. In static measurements of pressure, for example, both of these variational sensor errors are of importance. In dynamic measurements, the offset error is of little significance but does signify a gain change in the sensor.

The first two embodiments of this invention discussed below apply to dynamic sensor systems where the offset error is forced to zero resulting in a constant gain factor for the sensor system. The third embodiment applies to static measurements of pressure, for example, where both sensor system sensitivity and offset can be significant.

Figure 1:
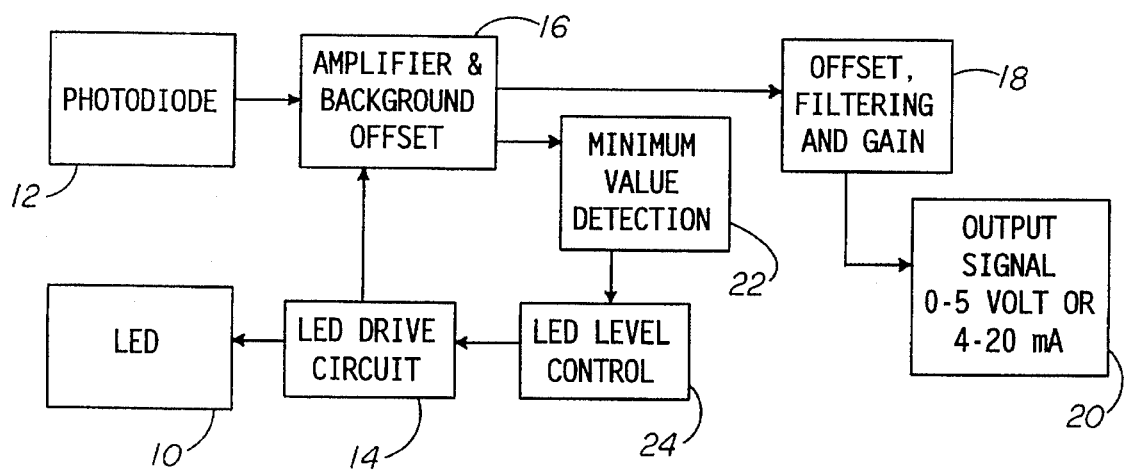
FIG. 1 is a schematic block diagram of a suitable compensation and status monitoring device for a fiber optic intensity-modulated sensor.

A functional block diagram of a basic interface/monitoring unit that incorporates the single optical source and single detector of the fiber optic sensor system is shown in FIG. 1. The unit consists of an optical source 10 (typically an LED), a detector 12 (typically a photodiode), an optional optical coupler and associated electronics circuitry 14.

At initial power on, the LED 10 launches light into the optical coupler (not shown). The returned light intensity is measured at the detector 12. Any offsets (optical or electrical) are eliminated by the background offset circuit 16 and the amount of offset is continuously corrected for as the LED intensity varies.

The offset is adjusted before the sensor is connected by monitoring one of the diagnostic outputs. All patch cables are attached to the electronics with a "zero adjust plug" attached in place of the sensor. A potentiometer installed on the electronic board is adjusted so that the return voltage reads "zero".

The "zero adjust plug" comprises an optical connector, identical to the sensor optical connector, but with an optical fiber approximately two inches long attached thereto. The fiber end extending inside the connector ferrule is polished in exactly the same manner as with the sensor connector. The other fiber end is placed inside a metal ferrule identical to the ferrule that terminates the sensor optical fiber. Moreover, this ferrule is polished to match the sensor fiber terminating ferrule. Thus, the "zero adjust plug" is intended to possess the same reflection coefficient at the distal fiber end as the sensor optical fiber. The polished fiber end of the plug is capped with a non-reflecting and non-transmitting material. When the reflection coefficients of the plug and the sensor are identical, the sensor will be less susceptible to calibration errors as different patch cables are used to connect the sensor to the interface unit.

After the background is eliminated above, the remaining signal is used for two functions, control and dynamic output. The dynamic output portion 18 of the circuit performs three functions, offset elimination, gain, and filtering. After signal conditioning, the sensor output signal 20 will have the desired bandwidth and will maintain a 0–5.0 volt operating range, never drifting below zero.

The control portion 22 of the interface/monitoring unit measures and holds the minimum value of the dynamic waveform and that minimum value is forced to a known reference value (e.g., 5.00V). The latter is accomplished by slowly adjusting 24 the current to the LED 10 (bandwidth of DC to 0.1 Hz). The LED drive current value is also used for health monitoring of the sensor and for the offset circuit.

When a sensor system is connected to the interface/ monitoring unit of FIG. 1, the circuit will automatically adjust the LED drive current forcing the photodiode output voltage to be equal to the reference voltage. The sensitivity of the intensity modulated sensor is directly proportional to the reference voltage and is maintained continuously during operation by the adjustment of the LED current.

Calibration is maintained even if the fiber optic link is changed. For example, fiber optic connectors will exhibit intensity transmission changes of 10% or more with multiple re-connections, and fiber optic cable transmission varies with bending. Even with such link changes, the output remains calibrated without any user adjustments.

As noted above, health monitoring of the sensor is provided by monitoring the drive current through the LED 10. Under nominal sensor operating conditions, the LED current is typically at 50% of its maximum rating. When the sensor and optical fiber link are subjected to environmental and handling effects, the LED current varies. For example, in the event of a thermally induced sensor failure, fiber transmission efficiency would degrade slowly before complete failure. By monitoring the current level or the rate of change of the current through the LED 10 potential sensor failure can be identified before actual failure. This ability of the interface/monitoring unit is particularly important in control applications where sensor failure may cause malfunction or even failure of a controlled device.

The interface/monitoring unit shown in FIG. 1 can be directly used with a two optical fiber sensor without a fiber optic coupler. One fiber connects to the LED 10 and the second fiber connects to the photodiode 12 in such a sensor system.

Figure 2:
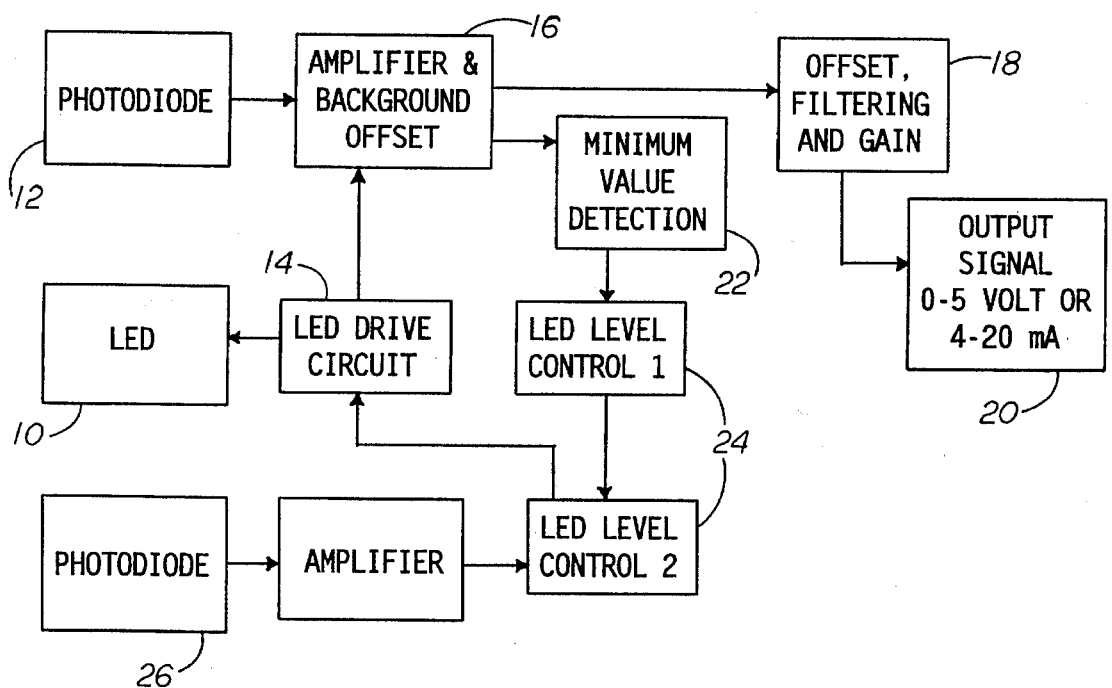
FIG. 2 is a schematic block diagram of the monitoring device with a reference photodetector added.

In a second version of the compensation technique and device, two detectors and a single source of light are used. As shown in FIG. 2, a 2×2 fiber optic coupler (not shown) is used and its fourth port is connected to a reference photodetector 26. The addition of the second detector 26 allows for enhanced intensity control of the fiber optic sensor system. Both detectors 12 and 26 are used sequentially for control. First, the minimum value 22 is used to maintain a sensor output referenced to 5.0V with a very low bandwidth as above (DC to 0.1 Hz). Second, photodetector 26 output allows for intensity changes over a broader bandwidth range (DC to 100 Hz or even several kHz). The second photodetector 26 precisely eliminates intensity fluctuations in the fiber optic coupler and in the LED 10 to fiber launch connection. These intensity fluctuations are typically caused by vibration, rapid temperature changes at the interface/monitoring unit, and aging of the LED 10 and detectors 10 and 26.

Figure 3:
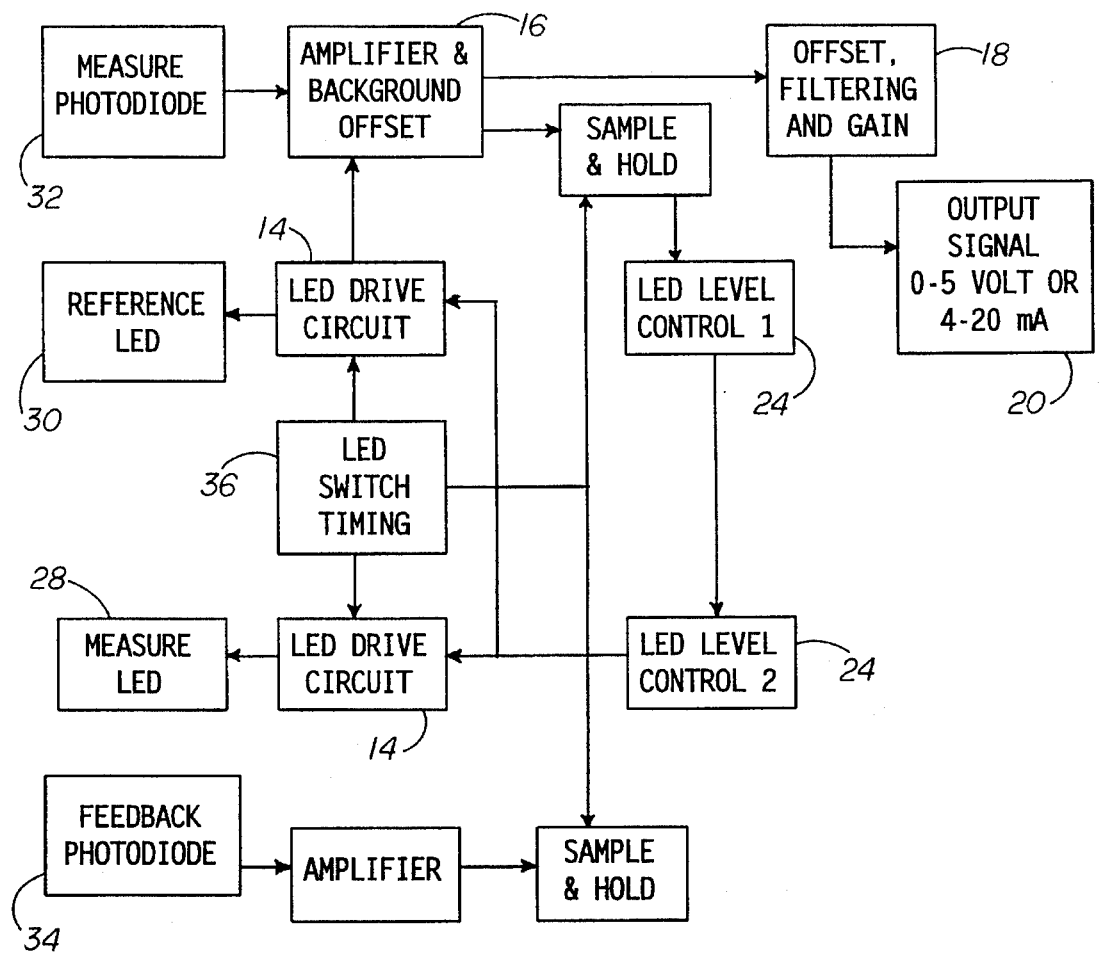
FIG. 3 is a schematic block diagram of a monitoring device with an additional reference LED added.

The third version of the compensation technique and device uses two sources and two photodetectors as shown in FIG. 3. Unlike the above two techniques, which are directed to dynamic changes in detection only, this version is directed to static changes in measurement. This third technique requires that the sensor have a dispersive element, such as a long pass filter, somewhere in the optical path. In U.S. Pat. No. 5,421,195 noted above and incorporated by reference herein, disclosed is a design for such a filter. The filter is deposited on the surface of an optical fiber connector that connects a fiber sensor pigtail to a patch cable. Such a filter transmits light of one wavelength $L_m$ and reflects light of another wavelength $L_r$.

A 3×2 fiber optic coupler is used with two of its input ports connected to two LEDs 28 and 30 of $L_m$ and $L_r$ wavelengths, respectively. The third input port of the coupler is connected to a measuring photodiode 32. One output port of the coupler is connected to the reference photodiode and the second output port is terminated with an optical fiber connector. The two LEDs 28 and 30 are time division multiplexed 36 by being turned on sequentially with the measuring LED 28 on most of the time and the reference LED 30 on during the remaining time.

At initial power on, the LEDs' 28 and 30 intensities are set to predetermined values, as measured by the reference photodiode 34, by adjusting the current levels flowing through the LEDs. As the reference signal from the reference photodiode 34 changes due to such factors as fiber bending, connector instability, or thermal effects on the fiber, the reference LED 30 current is adjusted so that the corresponding signal, detected by the measuring photodiode 32, is kept constant. The measuring LED 28 current is adjusted at the same instant by exactly the same fractional amount. The net effect of such adjustment is to cause any common light transmission changes for the two wavelengths to be compensated.

We claim:

1. A fiber optic sensor compensation and monitoring device comprising an optical light source and electronic drive circuit for the optical light source, an optical light detector and electronic amplifier for the optical light detector, a background offset circuit in communication with the optical light detector and the electronic drive circuit, a minimum value detector in communication with the electronic amplifier and background offset circuit, and an optical light source level control in communication with the electronic drive circuit and the minimum value detector, whereby the minimum value of the dynamic waveform from the electronic amplifier, corrected for background offset, is forced to a known reference value by adjusting the current to the optical light source and, whereby the dynamic waveform from the electronic amplifier, corrected for background offset, is separately conditioned for dynamic output within a specified voltage range.

2. The fiber optic sensor compensation and monitoring device of claim 1 including means to zero adjust the background offset circuit.

3. The fiber optic sensor compensation and monitoring device of claim 2 wherein the means to zero adjust include a zero adjust plug engaged in substitution for the fiber optic sensor.

4. The fiber optic sensor compensation and monitoring device of claim 1 including a second optical light detector and second electronic amplifier for the second optical light detector, a second optical light source level control in communication with the second electronic amplifier, the electronic drive circuit and the first optical light source level control, whereby the second optical light source level control corrects for intensity fluctuations over a broader bandwidth than the first optical light source level control.

5. The fiber optic sensor compensation and monitoring device of claim 4 including a second optical light source and second electronic drive circuit for the second optical light source, a switch in communication with each electronic drive circuit to multiplex the activation of the first and second optical light sources, whereby static changes in measurement can be detected by activation of the second optical light source with detection thereof by the second optical light detector.

* * * * *